United States Patent [19]

Saksa

[11] Patent Number: 5,659,611
[45] Date of Patent: Aug. 19, 1997

[54] WRIST TELEPHONE

[75] Inventor: Raymond A. Saksa, Brownsburg, Ind.

[73] Assignee: Lucent Technologies Inc., Murray Hill, N.J.

[21] Appl. No.: 649,368

[22] Filed: May 17, 1996

[51] Int. Cl.$^6$ .................................................. H04M 1/00
[52] U.S. Cl. .......................... 379/433; 379/434; 379/428
[58] Field of Search .................................. 379/433, 428, 379/434; 455/89, 90; 368/4, 10, 13, 47, 281, 282

[56] References Cited

U.S. PATENT DOCUMENTS 5,239,521  8/1993  Blonder .................................. 368/10
5,467,324  11/1995 Houlihan ................................ 379/428

*Primary Examiner*—Jack K. Chiang

[57] ABSTRACT

A radiotelephone wrist instrument wherein the microphone and speaker are releasably mounted to the tips of respective fingers of the user's hand.

10 Claims, 3 Drawing Sheets

5,659,611

WRIST TELEPHONE

BACKGROUND OF THE INVENTION

This invention relates to a radiotelephone instrument adapted to be worn on the wrist of a user.

Recent progress in microelectronics has greatly miniaturized radio communication devices such as receivers, transmitters and antennas. This miniaturization has permitted the integration of these components into wrist-carried radiotelephone instruments.

Such a portable wrist-carried radiotelephone instrument is disclosed, for example, in U.S. Pat. No. 5,239,521, issued Aug. 24, 1993, to Blonder. The disclosed wrist-carried radiotelephone instrument comprises a case having a display and a strap having a top layer and a bottom layer. The top layer of the strap has a releasable end to allow the top layer to separate from the bottom layer in the area where one end of the strap is attached to the case. The top layer of the strap remains attached to the bottom layer of the strap via a hinge which also permits the top layer to rotate. The hinged area of the strap is located on the inner wrist of the wearer. Embedded within the top layer of the strap are a microphone and a speaker which are connected via conductors to a transceiver disposed within the case. The speaker is located at the releasable end of the top layer of the strap and the microphone is located at the hinged end of the top layer of the strap.

In operation, the top layer of the strap is released from the bottom layer and is rotated in such a way that the speaker is located in the palm of the user's hand and the microphone is located along the inside of the user's wrist. The user's hand is then raised so that the user's palm is cupped over the user's ear. Sound ports are located on the front side of the speaker facing the user's ear. The user's hand is oriented such that the user's palm containing the speaker is proximate the user's ear and the microphone is proximate the user's mouth. This arrangement allows the instrument to be used as a telephone.

While effective for its intended purpose, it has been found that the aforedescribed instrument is limited in that the distance between the speaker and the microphone is fixed and may not be suitable for all users, especially those not of average size. It is therefore a primary object of the present invention to provide a wrist-carried radio telephone instrument of the type described wherein the speaker-to-microphone distance is automatically adjustable to fit every user.

SUMMARY OF THE INVENTION

The foregoing and additional objects are attained in accordance with the principles of this invention by providing a radiotelephone wrist instrument comprising a case with a transceiver disposed therein, a band attached to the case for fastening the case to a user's wrist, a microphone and a speaker. A first mounting means is provided for releasably mounting the microphone to a finger of the user on the hand associated with the wrist to which the case is fastened and a second mounting means is provided for releasably mounting the speaker to another finger of the user on that same hand. Electrical connections are provided between the microphone and the transceiver and between the speaker and the transceiver.

In accordance with an aspect of this invention, each of the first and second mounting means includes a respective thimble-like cap adapted to fit over the tip of the respective finger.

In accordance with another aspect of this invention, the speaker cap is adapted to fit over the tip of the user's thumb and the microphone cap is adapted to fit over the tip of the user's fourth finger (pinkie).

In accordance with a further aspect of this invention, at least one of the electrical connections between the microphone and the transceiver and between the speaker and the transceiver additionally functions as an antenna for the transceiver.

In accordance with yet another aspect of this invention, the electrical connection wires retract close to or into the case.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
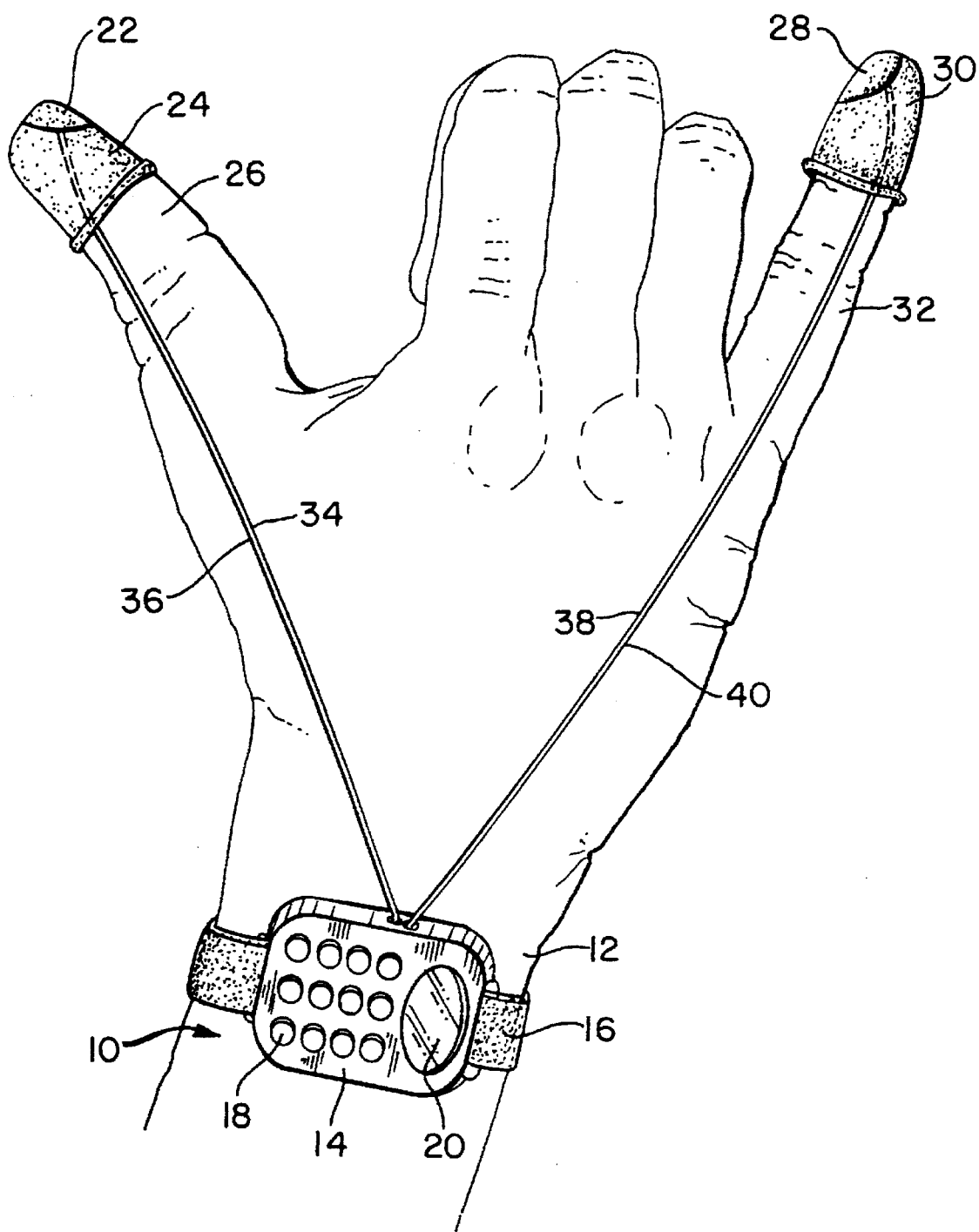
FIG. 1 is a perspective view of a radiotelephone wrist instrument according to this invention secured to a user's wrist with the speaker and microphone mounted on the user's fingers.
Figure 2:
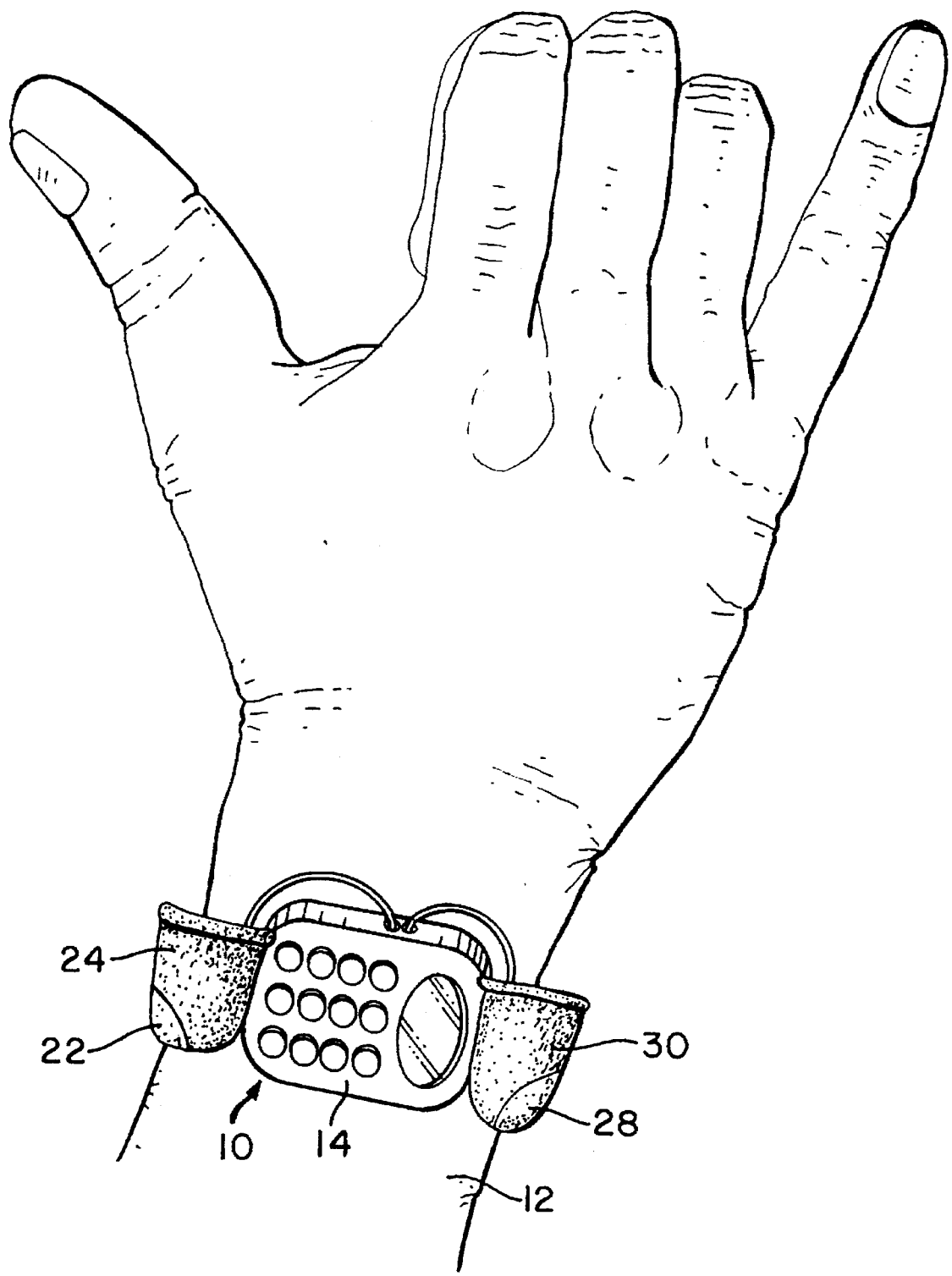
FIG. 2 is a view similar to FIG. 1 showing the speaker and microphone in their retracted positions.

Referring to the drawings, FIG. 1 shows a radiotelephone wrist instrument, designated generally by the reference numeral 10, secured to the wrist 12 of a user. The instrument 10 includes a case 14 and a strap, or band, 16. The strap 16 is attached to the case 14 and holds the case 14 onto the wrist 12, in a conventional manner, like a wristwatch band. The case 14 contains a conventional miniaturized transceiver (not shown) designed to provide two-way mobile telephone communications, a means for initiating a telephone call with a keyboard 18 or voice recognition device (not shown), a display 20 and a power supply such as a battery (not shown). Time keeping, alarm or pager circuitry can also be incorporated into the case 14.

As with all radiotelephone instruments, the instrument 10 also includes a speaker and a microphone. According to the present invention, the speaker and the microphone are located remote from the case 14 and are arranged to be releasably mounted to the tips of respective fingers of the user's hand. In the illustrative embodiment shown in the drawings, the speaker 22 is secured to the thimble-like cap 24 adapted to fit over the tip of the thumb 26 on the hand of the user which is associated with the wrist 12 to which the instrument is fastened. Similarly, the microphone 28 is secured to the thimble-like cap 30 which is adapted to fit over the tip of the fourth finger (pinkie) 32 of the user's hand associated with the wrist 12. To couple the speaker 22 with the transceiver, a pair of electrical wires 34, 36 are provided. Similarly, a pair of electrical wires 38, 40, are provided for coupling the microphone 28 with the transceiver. The wires 34, 36, 38, 40 thus function to provide both electrical and mechanical connections between the transceiver and the speaker 22/microphone 28. One or more of the wires 34, 36, 38, 40 can also be connected within the transceiver to function as an antenna for the transceiver, in a manner known in the art.

Figure 3:
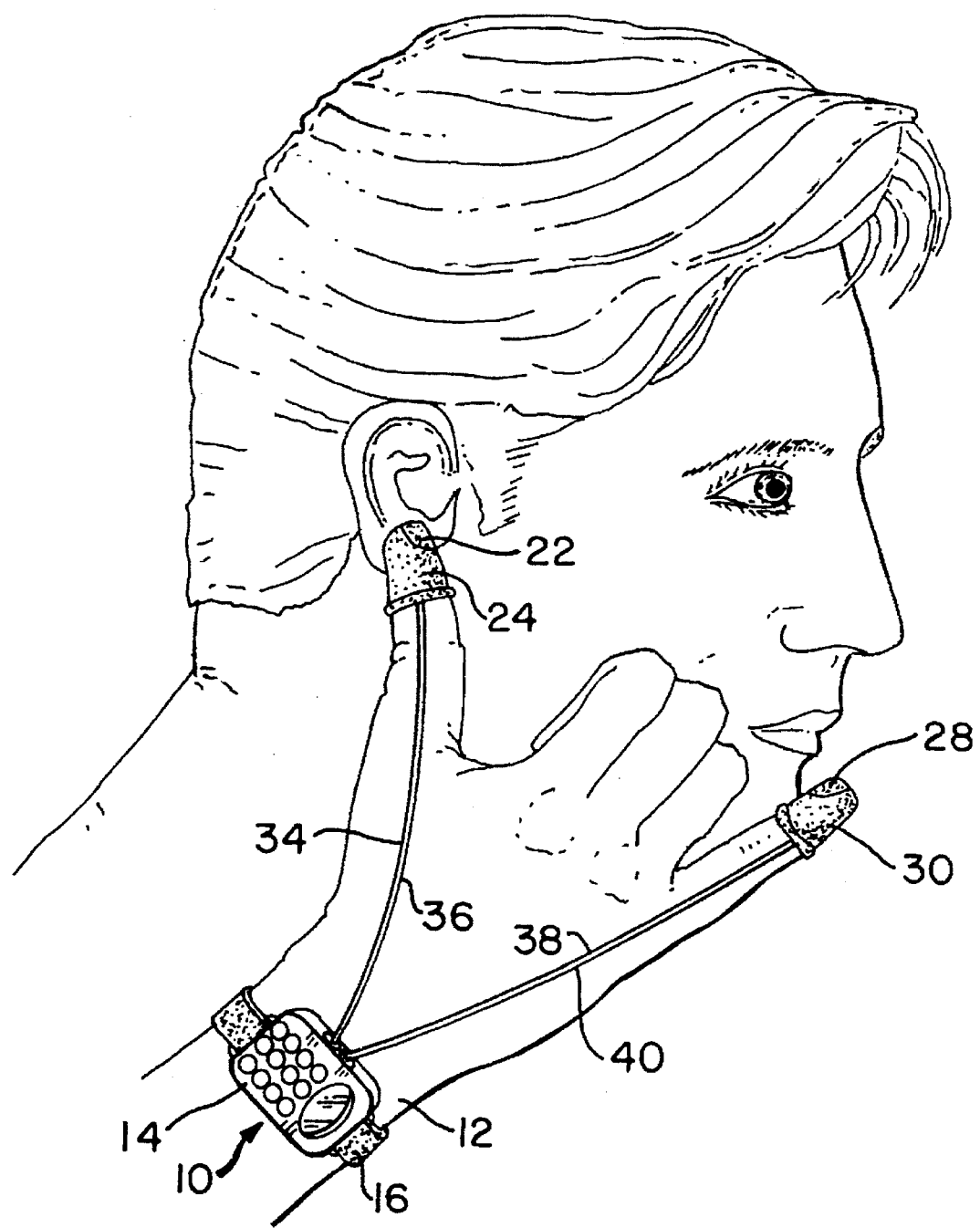
FIG. 3 is a simplified drawing showing the radio telephone wrist instrument according to this invention being used as a telephone.

When the radiotelephone instrument 10 is in use, the caps 24, 30 are placed on the tips of the respective fingers and the user then places the tip of the thumb adjacent his/her ear and the tip of the pinkie adjacent his/her mouth, as shown in FIG. 3. With this arrangement, the distance between the speaker 22 and the microphone 28 is automatically adjusted for the individual user. Further, since the speaker 22 can be placed in very close proximity to the user's ear, a low power audio receiver can be used. Additionally, since the wires 34, 36, 38, 40 are on the back of the user's hand, away from the user's head, exposure of the head to radiated RF energy is reduced.

When the radiotelephone instrument 10 is not in use, a retraction mechanism (not shown) within or on the case 14 pulls the wires 34, 36, 38, 40 so that the caps 24, 30 are in close proximity to the case 14. The caps 24, 30 may be secured to either the case 14 or the strap 16 in any desirable manner, such as by a hook and loop fastener or a clip. The retraction mechanism can be any known mechanism, such as a spring-loaded reel, or can be structure about which the wires 34, 36, 38, 40 are hand wound.

Although thimble-like caps 24, 30 have been illustrated for releasably mounting the speaker 22 and the microphone 28 on the tips of the user's fingers, other suitable mounting structure may be provided, such as a closed ring, which may be rigid, flexible or elastic. The provision of such rings, instead of the caps, results in a more compact arrangement in the retracted state. Further, although mounting of the speaker and microphone on the user's thumb and pinkie have been illustrated, it is understood that the user may select whichever fingers are most comfortable.

Accordingly, there has been disclosed an improved radiotelephone instrument for wearing on the wrist of a user. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

What is claimed is:

1. A radiotelephone wrist instrument comprising:
   a case with a transceiver disposed therein;
   a band attached to the case for fastening the case to a user's wrist;
   a microphone;
   a speaker;
   first mounting means for releasably mounting the microphone to a finger of the user on the hand associated with the wrist to which the case is fastened;
   second mounting means for releasably mounting the speaker to another finger of the user on said associated hand;
   first electrical connection means for providing an electrical connection between the microphone and the transceiver; and
   second electrical connection means for providing an electrical connection between the speaker and the transceiver.

2. The instrument according to claim 1 wherein each of said first and second mounting means includes a respective thimble cap adapted to fit over the tip of the respective finger.

3. The instrument according to claim 1 wherein:
   said first mounting means includes a first cap adapted to fit over the tip of the fourth finger (pinkie) of the user on said associated hand; and
   said second mounting means includes a second cap adapted to fit over the tip of the thumb of the user on said associated hand.

4. The instrument according to claim 1 wherein:
   said first electrical connection means includes a first pair of electrical wires extending between said transceiver and said microphone; and
   said second electrical connection means includes a second pair of electrical wires extending between said transceiver and said speaker.

5. The instrument according to claim 4 further including means for retracting said first and second pairs of electrical wires close to said case.

6. The instrument according to claim 4 wherein at least one of said electrical wires is connected to additionally function as an antenna for said transceiver.

7. A radiotelephone wrist instrument comprising:
   a case;
   a transceiver mounted within said case;
   a strap secured to the case and adapted to fasten the case to a wrist of a user;
   a first thimble cap adapted to fit over the tip of a first finger of the user on the hand associated with the wrist to which the case is fastened;
   a second thimble cap adapted to fit over the tip of a second finger of the user on said associated hand;
   a microphone secured to the first cap;
   a speaker secured to the second cap;
   at least one electrical wire providing an electrical and a mechanical connection between said microphone and said transceiver; and
   at least one electrical wire providing an electrical and a mechanical connection between said speaker and said transceiver.

8. The instrument according to claim 7 wherein at least one of said electrical wires is connected to additionally function as an antenna for said transceiver.

9. A radiotelephone wrist instrument including a case, a transceiver within the case, a strap secured to the case for fastening the case to a wrist of a user, a microphone coupled to the transceiver and a speaker coupled to the transceiver, CHARACTERIZED BY:
   first mounting means for releasably mounting the microphone to a first finger of the user; and
   second mounting means for releasably mounting the speaker to a second finger of the user.

10. The instrument according to claim 9 further CHARACTERIZED IN THAT:
   said first mounting means includes a first cap adapted to fit over the tip of the fourth finger (pinkie) of the user on the hand associated with the wrist to which the case is fastened; and
   said second mounting means includes a second cap adapted to fit over the tip of the thumb of the user on said associated hand.

* * * * *